United States Patent [19]

Hoyle, Jr.

[11] 3,855,209
[45] Dec. 17, 1974

[54] SYNTHESIS OF INDOLININIUM METHINE DYES

[75] Inventor: Vinton A. Hoyle, Jr., Kingsport, Tenn.

[73] Assignee: Eastman Kodak Company, Rochester, N.Y.

[22] Filed: Sept. 4, 1973

[21] Appl. No.: 394,033

[52] U.S. Cl. .......................... 260/240 E, 260/240.9
[51] Int. Cl. ............................................. C07d 27/56
[58] Field of Search ..................... 260/240 E, 240.9

[56] References Cited
UNITED STATES PATENTS
3,700,661  10/1972  Saucy et al. ...................... 260/240 E
3,758,466  9/1973  Fisher et al. ..................... 260/240 E Primary Examiner—G. Thomas Todd

[57] ABSTRACT

Process for the preparation of a cationic indolininium methine dye compound having the formula $$[A-CH=CH-B]^+ X^-$$

which comprises contacting a preformed solution of a Vilsmeier adduct, formed by contacting an amine having the formula H—B with $POCl_3$ or phosgene and a di-lower alkylformamide, with a 2-methylindolininium salt having the formula $$A-CH_3{}^+ X^-,$$

wherein A is a 2-indolininium residue, B is an aniline, tetrahydroquinoline or indole residue and X is an anion.

10 Claims, No Drawings

SYNTHESIS OF INDOLININIUM METHINE DYES

This invention relates to a novel process for making cationic, indolininium, methine dye compounds, including basic or cationic styryl compounds, useful for dyeing synthetic fibers containing anionic dye sites.

According to known techniques, cationic, indolininium methine compounds, such as Colour Index Basic Reds 13 and 14, are prepared in accordance with the Vilsmeier reaction by treating an aromatic amine such as an aniline compound, an indole or a 1,2,3,4-tetrahydroquinoline, with a N,N-dialkylformamide and a dehydrating agent such as $POCl_3$ followed by drowning in water to obtain the corresponding formyl amine. The formyl amine compound is then condensed with a 2-methyl indolininium salt to yield the cationic methine compound. In commercial operations, the formyl amine generally is isolated by filtration and then is dissolved in an acid, such as acetic acid, prior to the addition of a 2-methyleneindoline compound. The acid present converts the indoline compound to the corresponding 2-methylindolininium salt which reacts with the formyl amine to form the methine compound.

The isolation of the formyl amine compound according to the known synthesis techniques described above is disadvantageous for a number of reasons. For example, the precipitation and filtration is time consuming and requires additional equipment, thus adding to the cost of the methine compounds. Also, the drowning and filtration steps often result in a significant loss in yield of the formyl amine.

The disadvantages inherent in the known procedures utilized in synthesizing methine compounds are avoided by the process of my invention which comprises contacting a preformed solution of a Vilsmeier adduct, formed by contacting an aromatic or cyclic amine having the formula H—B with a dehydrating agent, such as $POCl_3$ or phosgene, and a di-lower alkylformamide, with a 2-methylindolininium salt having the formula $[A—CH_3]^+X^-$. Not only is the isolation of a formyl amine compound avoided, but the Vilsmeier adduct employed in my proess is significantly more reactive than the corresponding formyl compound. Thus, lower temperatures and shorter reaction times can be used in the condensation reaction of my process.

The cationic, indolininium, methine compounds obtained in accordance with my process have the general formula $$[A—CH=CH—B]^+X^-$$

(I)

wherein A is the residue of a 2-indolininium component of a cationic methine dye compound; B is the residue of an aniline, 1,2,3,4-tetrahydroquinoline or indole component of a cationic or disperse methine dye compound; and X is a colorless anion. As is well-known in the art, the aniline and tetrahydroquinoline residues represented by B are bonded to the methine group —CH=CH— of formula (I) by an aromatic ring carbon atom in the position para to the nitrogen atom of the aniline or tetrahydroquinoline nuclei, i.e., at the 6-position of the tetrahydroquinoline residue. It is also known that the indole residue represented by B is attached to the methine group at the 3-position of the indole nucleus.

The compounds of formula (I) are useful for dyeing synthetic fibers containing, in the polymeric materials from which they are made, anionic dye sites, e.g., alkali metal sulfonate groups. Examples of such fibers include acrylic, modacrylic and polyester fibers containing sulfonate groups. During the dyeing of such fibers, the cation of the compounds of formula (I) bonds with the mentioned anionic dye site and the anion X is either discharged from the bath or is subsequently rinsed from the dyed fibers. Thus, the particular anion represented by X is not critical to the utility of the compounds of formula (I). Typical of the anions X are Cl, Br, I and $ZnCl_4/2$ The cation of formula (I) also can be precipitated as the 1,5-naphthalene disulfonic acid salt which is waterinsoluble and is used in pad baths and printing pastes. Depending upon the technique by which the methine compound is isolated, all or a part of anion X can consist of one or more phosphate ions derived from the $POCl_3$ utilized in synthesizing the Vilsmeier adduct.

The compounds of formula (I) and residues A and/or B are well known in the art of methine dyes. The following are some of the patents disclosing such compounds and/or residues:

| | | |
|---|---|---|
| U.S. 2,155,447 | U.S. 2,166,487 | U.S. 3,247,211 |
| U.S. 2,230,789 | U.S. 2,179,895 | U.S. 3,326,960 |
| U.S. 2,242,474 | U.S. 2,206,108 | U.S. 3,349,098 |
| U.S. 2,350,393 | U.S. 2,583,551 | U.S. 3,390,168 |
| U.S. 2,734,901 | U.S. 2,649,471 | U.S. 3,422,133 |
| U.S. 2,179,895 | U.S. 2,766,233 | U.S. 3,435,062 |
| U.S. 2,280,253 | U.S. 2,776,310 | U.S. 3,453,280 |
| U.S. 3,113,825 | U.S. 2,789,125 | U.S. 3,555,016 |
| U.S. 3,379,723 | U.S. 2,811,544 | British 1,173,679 |
| U.S. 3,394,130 | U.S. 2,850,520 | British 1,138,583 |
| British 463,042 | U.S. 2,914,551 | British 1,138,582 |
| German 1,044,022 | U.S. 3,027,220 | British 1,053,997 |
| German 1,049,974 | U.S. 3,189,641 | British 1,049,315 |
| U.S. 1,950,421 | U.S. 3,240,783 | British 1,036,079 |
| U.S. 2,053,819 | | |

Additional indole residues are described in pending U.S. application Ser. No. 210,173, filed Dec. 20, 1971.

The most common of the indolininium residues represented by A have the formula

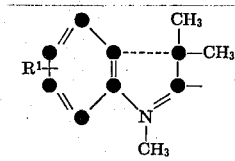

in which $R^1$ is hydrogen, lower alkyl, lower alkoxy, halogen such as chlorine and bromine, or lower alkoxycarbonyl. As used herein to describe a group containing an alkyl moiety, "lower" designates a carbon content of up to about four carbon atoms. When $R^1$ is a substituent, i.e., other than hydrogen, it preferably is present in the 5-position. The indolininium residue in which $R^1$ is hydrogen is preferred.

The residue represented by B can be any of the aniline, indole or 1,2,3,4-tetrahydroquinoline residues described in the patents referred to herein or variations of such residues. Since the quaternary nitrogen of residue A gives the methine compounds affinity for fibers containing anionic dye sites, residue B can be any of the above-mentioned amine residues which are components of either basic or disperse methine dyes. Typical of the residues represented by B are the group having the formulas

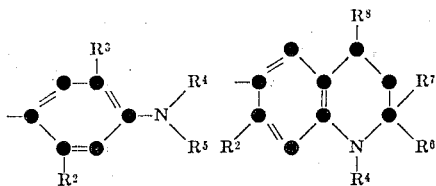

and

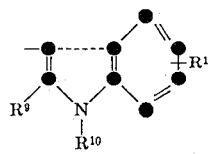

wherein $R^2$ and $R^3$ are hydrogen, lower alkyl, lower alkoxy or halogen; $R^4$ and $R^5$ individually are unsubstituted alkyl containing up to about 12 carbon atoms or cyclohexyl; $R^4$ and $R^5$ collectively are $-(CH_2)_5-$, $-CH_2CH_2OCH_2CH_2-$ or $-CH_2CH_2SO_2CH_2CH_2-$; $R^6$, $R^7$ and $R^8$ each is hydrogen or lower alkyl; $R^9$ is lower alkyl or aryl; and $R^{10}$ is hydrogen or lower alkyl. The aryl groups referred to herein and those contained in arylmoiety containing groups include phenyl and phenyl substituted with nonionic substituents such as lower alkyl, lower alkoxy, halogen, lower alkoxycarbonyl, cyano, carbamoyl, etc. Preferred groups represented by B are the aniline and indole residues set forth above in which $R^2$ is hydrogen, methyl, methoxy, ethoxy or chlorine;

$R^3$ is hydrogen, methyl, methoxy or ethoxy;

$R^4$ is lower alkyl; cyclohexylmethyl; benzyl; benzyl substituted with lower alkyl, lower alkoxy, chlorine, bromine or lower alkoxycarbonyl; aryl; or a group having the formula $-R^{11}R^{12}$ in which $R^{11}$ is ethylene, propylene, trimethylene or tetramethylene and $R^{12}$ is chlorine, bromine, lower alkanoyloxy, cyano, lower alkoxycarbonyloxy, arylcarbamoyloxy, lower alkylcarbamoyloxy, aroyloxy, lower alkoxycarbonylbenzoyloxy, lower alkoxy, chlorine, aryloxy, 2-benzothiazolylthio, or a group having the formula

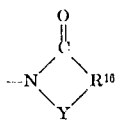

in which Y is $-CO-$, $-SO_2-$, or $-CH_2-$ and $R^{16}$ is ethylene, propylene, trimethylene or o-arylene;

$R^5$ is lower alkyl; cyclohexyl; lower alkylcyclohexyl; benzyl; benzyl substituted with lower alkyl, lower alkoxy, chlorine or bromine; aryl; or a group having the formula $-R^{11}-R^{13}$ in which $R^{11}$ is ethylene, propylene, trimethylene or tetramethylene and $R^{13}$ is lower alkanoyloxy, lower alkoxycarbonyloxy, aroyloxy or lower alkoxy;

$R^9$ is aryl;

$R^{10}$ is hydrogen or lower alkyl; and $R^1$ is hydrogen;

in which each aryl moiety is phenyl, tolyl, lower alkoxyphenyl or chlorophenyl.

The intermediate compounds which, in accordance with my invention, are reacted with a 2-methylindolininium salt, are obtained from aromatic amines according to known techniques or procedures analogous thereto by contacting the amine with a combination of an acid chloride, such as $POCl_3$ or phosgene, and a di-lower-alkylformamide, such as dimethylformamide (DMF) according to the Vilsmeier reaction. Although only equimolar amounts of the amine, the acid chloride and the dialkylformamide are necessary, complete conversion of the amine to the intermediate compound is enhanced by using excess dialkylformamide as the solvent and a slight excess, e.g., up to 25 percent molar excess based on the moles of amine used, of the acid chloride. If desired, other water-miscible solvents containing no active hydrogen, such as trilower alkylphosphates, diglyme, and glycol diethers can be used in combination with the dialkylformamide. As is known, the medium in which the intermediate compound is formed should be essentially anhydrous to avoid undue hydrolysis of the acid chloride. The amines used in the synthesis have the formulas H—B and are defined hereinabove.

The Vilsmeier adducts used in my novel process have not been characterized by general formulas because the formula for any of such adducts has not been definitely established. Mahens, *Bull. Societe Chim. de France*, No. 10, 1989—1999 (1962) indicates that the formula for the Vilsmeier adducts used in my process is

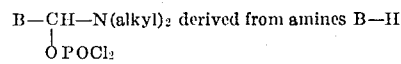

However, Fieser and Fieser, *Reagents for Organic Synthesis*, p 284, John Wiley & Sons, Inc. (1967) suggest that the formula for the intermediates is

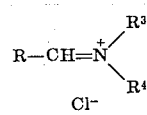

It also is possible that the above cations can be associated with the anion $PO_2Cl_2$ rather than with only the chloride ion shown. In view of the uncertainties concerning the structure of the Vilsmeier intermediates, such intermediates are described herein and in the claims simply by means of the known technique by which they are obtained.

The solvent in which the intermediate compound is dissolved prior to reaction with the active methylene compound can be any which is inert to the reactants. Preferably, the solvent is the same as that used in the synthesis of the intermediate compound which is not isolated prior to its reaction with the active methylene compound. If desired, auxiliary solvents such as those mentioned above can be utilized.

The residue represented by A is derived from 2-methylindolininium salts which in turn are derived from 2-methyleneindoline bases by acidification of the latter by known means. The 2-methylindolininium salts can be formed, for example, by dissolving the 2-methyleneindoline base in acetic acid, prior to contacting it with the solution of the intermediate compound. Alternatively, the 2-methyleneindoline can be combined with the solution of the intermediate compound in which the acid residues of the acid chloride employed in the synthesis of the intermediate compound convert the 2-methyleneindoline base to the 2-methylindolininium salt. The proportion of the intermediate compound to the 2-methylindolininium salt is not critical. However, for the process to be most economical, about equimolar portions of the intermediate compound and the 2-methylindolininium salt usually should be used.

The temperature range over which my process can be carried out is not important. Temperatures within the range of about 0° to 125° C. can be used successfully with temperatures in the range of about 10° to 80° C., especially about 20° to 80° C. being preferred. Although it is not advantageous, the process can be carried out at pressures moderately above or below atmospheric pressure.

The reaction medium of my novel process is generally essentially anhydrous due to the consumption of any trace amounts of water by the intermediate compound or by the presence of any $POCl_3$ residues present.

In combining the 2-methylindolininium salt or the 2-methyleneindoline base with the solution of the intermediate compound, it is advantageous to dilute the salt or base with an organic solvent in which the salt or base is soluble or with which the salt or base is miscible. Examples of the solvents which can be used include the lower alkanols such as methanol, ethanol, propanol, and isopropanol, glycols such as ethylene glycol, propylene glycol and diethylene glycol, glycol ethers such as 2-methoxyethanol, 2-ethoxyethanol and diethylene glycol dimethyl ether, di-lower-alkylalkanoylamides such as DMF and dimethylacetamide, and tri-lower alkylphosphate such as triethylphosphate.

The cationic methine product can be isolated by a number of techniques. Depending on the solvents, and the amounts thereof present in the reaction mixture, a portion of essentially all of the methine product may be precipitate from the reaction mixture. Precipitation of the product can be effected most efficiently by converting the cationic methine product to a salt of lower solubility in the reaction mixture. Examples of such salts include the zinc chloride double salt, the iodide salt, tetrafluoroborate and perchlorate. The methine compound also can be precipitated from the reaction mixture by adding thereto a hydrocarbon such as toluene or heptane. The means by which the methine compound is separated from the reaction mixture will depend on the purity desired, the filtration apparatus available and other factors.

The results obtained from my novel process will vary depending upon the technique by which the Vilsmeier adduct and 2-methylindolininium salt are combined and the method used to isolate the methine product. I have found that the methine product of superior quality is obtained in excellent yields when the Vilsmeier adduct solution is added to a solution of the 2-methylindolininium salt or the 2-methyleneindoline base in a water-miscible solvent. Examples of such water-miscible solvents are set forth above relative to the solvents in which the salt or base is soluble or with which the salt or base is miscible. Generally, good results are obtained when the weight ratio of salt or base to solvent is in the range of about 1:7 to about 1:20. The resulting methine compound can be isolated by converting it, as mentioned previously, to a salt of low water solubility. Preferably, this is accomplished by combining the reaction mixture in which the methine compound is formed with an aqueous solution of one or more salts or acids which convert the cationic methine compound to a compound of low water solubility. Examples of such salts include zinc chloride in combination with sodium or potassium chloride, sodium or potassium iodide, sodium or potassium tetrafluoroborate, sodium or potassium perchlorate or perchloric acid. The amount of salt or acid which gives optimum results is, of course, dependent on the amount of methine compound which is to be isolated and can be readily determined. The amount of water in which the salts or acids are dissolved is not of significant importance. Usually, salt or acid solutions in which the required salt or acid is present in a weight concentration of about 5 to about 15 percent gives good results. If any methine compound precipitates when it is first formed by the addition of the Vilsmeier adduct to a solution of the indolininium salt or indoline base, it is advantageous, but not necessary, to dissolve it by adding a solvent such as water. The preferred technique is to add the mixture in which the methine compound is first formed to a solution of the salt or acid. After forming the methine compound and converting it to a salt of relatively low water solubility, as described, the methine compound can be recovered by filtration.

Another method by which the methine compound can be formed and isolated according to my novel process is adding the 2-methylindolininium salt or 2-methyleneindoline base, either undiluted or diluted with one or more of the water-miscible solvents mentioned above, to the Vilsmeier adduct solution. When this method is used, an acid acceptor should be present, either during formation of the methine compound or prior to the conversion of the methine compound first formed to the methine compound of relatively low water solubility. If an acid acceptor is not employed, a gummy precipitate forms when the methine compound first formed is combined with the solution of one or more salts or acids which converts the methine product to a cationic methine compound having relatively low solubility. Examples of such acid acceptors include alkali metal salts of lower carboxylic acids such as sodium and potassium acetate, alkali metal carbonates and bicarbonates such as sodium carbonate, potassium carbonate, sodium bicarbonate and potassium bicarbonate, alkali metal hydroxides such as sodium and potassium hydroxide and tertiary amines such as tri-lower alkylamines and pyridine. The amount of acid acceptor which will give the best results will vary depending on the acid acceptor used, the amount of $POCl_3$ used in synthesizing the intermediate compound and the particular aromatic amine used in preparing the intermediate compound. Although the optimum amount of acid acceptor can be readily determined experimentally, the use of at least about 2 mole equivalents of acid acceptor per mole of $POCl_3$ used in the synthesis of the intermediate compound gives superior results. For example, the use of 1 mole of $POCl_3$ in the synthesis of the intermediate compound will generally require, for best yields, at least 2 moles of sodium acetate or sodium bicarbonate and at least 1 mole of sodium carbonate. The use of more than the optimum amount of acid acceptor is not detrimental although it can add to the cost of the methine compound product. The mechanism by which the acid acceptor functions is not fully understood. The acid acceptor can be added to the Vilsmeier adduct solution, to the solution of the 2-methylindolininium salt or 2-methyleneindoline base, or to the mixture of the Vilsmeier adduct solution and the indolininium or indoline solution in which the methine compound is formed. The methine compound then can be converted to a salt of relatively low water solubility by the means described in the preceding paragraph.

My novel process is further illustrated by the following examples.

EXAMPLE 1

To a solution of 19.5 g. of 2-phenylindole in 60 ml. dimethylformamide at 20°–30° C. is added 17.6 g. of POCl$_3$. The temperature is raised to 60° C. and held at 60°–65° C. for 75 minutes and the reaction mixture is added to a solution of 17.5 g. 2-methylene-1,3,3-trimethylindoline in 80 ml. isopropanol. This reaction mixture is heated at 60°–65° C. for 90 minutes during which time a portion of the product is precipitated. To isolate the product, 250 ml. water at 60°–65° C. are added to put all the product in solution and the product solution is added to 400 ml. water containing 15 g. zinc chloride and 15 g. sodium chloride and stirred for 30 minutes at 20°–30° C. The precipitated product is collected by filtration, washed with 200 ml. of a 5 percent sodium chloride in water solution and dried. The yield of methine product having the structure

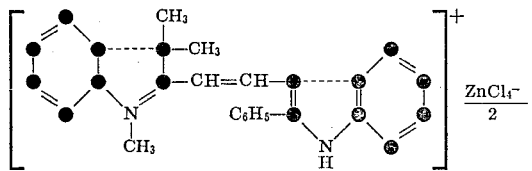

is 46.8 g.

EXAMPLE 2

According to the procedure described in Example 1, a solution of an intermediate compound, prepared by heating a solution of 35.5 g. of N-(2-cyanoethyl)-N-(2-succinimidoethyl)-m-toluidine, 75 ml. dimethylformamide and 22 g. POCl$_3$, is added to a mixture of 21.8 g. 2-methylene-1,3,3-trimethyl-indoline and 100 ml. isopropanol, the resulting mixture is heated and the product is isolated. The yield of product having the structure

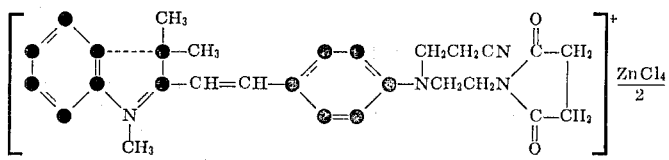

is 70.2 g., 97 percent of theory.

EXAMPLE 3

According to the procedure described in Example 1, a solution of a Vilsmeier adduct is prepared by heating a solution of 35.5 g. of N-(2-cyanoethyl)-N-(2-succinimidoethyl)-m-toluidine, 175 ml. dimethylformamide and 22 g. POCl$_3$. To the Vilsmeier adduct solution at 45°–50° C. is added 21.8 g. 2-methylene-1,3,3-trimethylindoline. The reaction mixture is maintained at 45°–50° C. for a 40-minute period during which 46.8 g. sodium acetate is added. The reaction mixture then is heated at 60°–65° C. for 1.5 hours after which time 250 ml. water is added with stirring. The methine compound is then converted to its zinc chloride double salt and isolated as described in Example 1.

EXAMPLE 4

To a solution of 35.5 g. of N-(2-cyanoethyl)-N-(2-succinimidoethyl)-m-toluidine in 100 ml. of dimethylformamide at 45° C. is added 22 g. of POCl$_3$. The reaction mixture is heated at 60°–65° C. for 1.4 hours and then is divided into two equal portions, one of which is added dropwise at 24° C. over a 20-minute period to a slurry of 50 ml. isopropanol, 23.3 g. sodium acetate and 10.9 g. 2-methylene-1,3,3-trimethylindoline. The temperature is then raised to 60° C. and heating at 60°–65° C. is continued for 1.5 hours after which 100 ml. toluene is added to the reaction mixture. After cooling, the precipitated methine product is filtered off and washed.

EXAMPLE 5

The second portion of the Vilsmeier adduct solution prepared in Example 4 is added dropwise at 30° C. over a 20-minute period to a mixture of 50 ml. isopropanol, 23.3 g. sodium acetate, 7.5 g. sodium chloride, 7.5 g. zinc chloride and 10.9 g. 2-methylene-1,3,3-trimethylindoline. The mixture is heated with stirring at 60°–65° C. for 1.5 hours during which 25 ml. isopropanol is added to facilitate stirring. After cooling the reaction mixture to about 20° C., 150 ml. water are added and the mixture is stirred for 30 minutes. The methine product is filtered off and washed with 125 ml. of 5 percent salt solution. The yield obtained is 30.5 g.

The process of my invention can be used in synthesizing many other cationic, indolininium methine dye compounds including Colour Index Basic Reds 13 and 14 and the indolininium methine dye compounds described in certain of the patents set forth herein. The optimum reaction conditions and manipulative steps which will give optimum results for the synthesis of dye compounds according to my novel process are readily determinable by those skilled in the art.

The invention has been described in detail with particular reference to preferred embodiments thereof, but it will be understood that variations and modifications can be effected within the spirit and scope of the invention.

I claim:

1. Process for the preparation of a cationic indolininium methine dye compound having the formula

[A—CH=CH—B]$^+$ X$^-$ which comprises contacting a preformed solution of a Vilsmeier adduct, formed by contacting an amine having the formula H—B with POCl$_3$ or phosgene and a di-lower alkylformamide, with a 2-methylindolininium salt having the formula A—CH$_3$$^+$ X$^-$, wherein A is the residue of a 2-indolininium component of a cationic methine dye compound;

B is the residue of an aniline, 1,2,3,4-tetrahydroquinoline or indole component of a cationic or disperse methine dye compound; and X is a colorless anion.

2. Process according to claim 1 for the preparation of a cationic indolininium methine dye having the formula

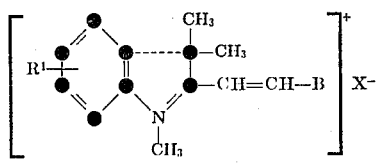

which comprises contacting a preformed solution of a Vilsmeier adduct, formed by contacting an amine having the formula H-B with $POCl_3$ or phosgene and a di-lower alkylformamide, with a 2-methylindolininium salt having the formula

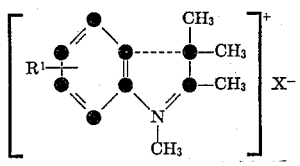

at a temperature of about 20° to about 80° C., wherein $R^1$ is a hydrogen, lower alkyl, lower alkoxy, halogen or lower alkoxycarbonyl;
X is a colorless anion; and
B is a group having the formula

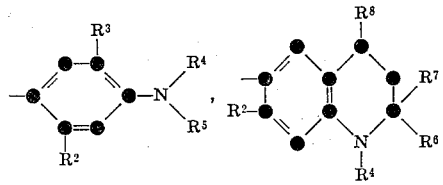

or

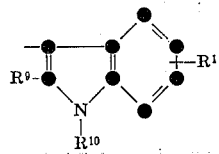

wherein
$R^1$ is defined above;
$R^2$ and $R^3$ each is hydrogen, lower alkyl, lower alkoxy or halogen;
$R^4$ and $R^5$ individually are unsubstituted or substituted alkyl containing up to 12 carbon atoms or cyclohexyl;
$R^4$ and $R^5$ collectively are $—(CH_2)_5—$, $—CH_2CH_2OCH_2CH_2—$ or $—CH_2CH_2SO_2CH_2CH_2—$;
$R^6$, $R^7$ and $R^8$ each is hydrogen or lower alkyl;
$R^9$ is lower alkyl, phenyl or phenyl substituted with lower alkyl, lower alkoxy or halogen; and
$R^{10}$ is hydrogen or lower alkyl.

3. Process accordiong to claim 2 wherein $R^1$ is hydrogen and —B is a group having the formula

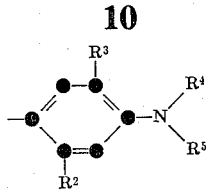

wherein
$R^2$ is hydrogen, methyl, methoxy, ethoxy, or chlorine;
$R^3$ is hydrogen,1 methyl, methoxy or ethoxy;
$R^4$ is lower alkyl; cyclohexylmethyl; benzyl, benzyl substituted with lower alkyl, lower alkoxy, chlorine, bromine or lower alkoxycarbonyl; aryl; or a group having the formula $—R^{11}—R^{12}$ in which $R^{11}$ is ethylene, propylene, trimethylene or tetramethylene and $R^{12}$ is chlorine, bromine, lower alkanoyloxy, cyano, lower alkoxycarbonyloxy, arylcarbamoyloxy, lower alkylcarbamoyloxy, aroyloxy, lower alkoxycarbonylbenzoyloxy, lower alkoxy, aryloxy, 2-benzothiazolythio, or a group having the formula

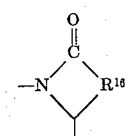

in which Y is —CO—, $—SO_2—$, or $—CH_2—$ and $R^{16}$ is ethylene, propylene, trimethylene or o-arylene; and
$R^5$ is lower alkyl; cyclohexyl, lower alkylcyclohexyl; benzyl; benzyl substituted with lower alkyl, lower alkoxy, chlorine or bromine; aryl; or a group having the formula $—R^{11}—R^{13}$ in which $R^{11}$ is ethylene, propylene, trimethylene or tetramethylene and $R^{13}$ is lower alkanoyloxy, lower alkoxycarbonyloxy, aroyloxy or lower alkoxy;
in which each aryl moiety is phenyl, tolyl, lower alkoxyphenyl or chlorophenyl and about one mole of indolininium salt per mole of amine is used.

4. Process according to claim 2 wherein $R^1$ is hydrogen and —B is a group having the formula

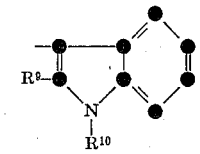

wherein
$R^9$ is phenyl, tolyl, lower alkoxyphenyl or chlorophenyl; and
$R^{10}$ is hydrogen or lower alkyl;
in which about one mole of indolininium salt per mole of amine is used.

5. Process for the preparation of a cationic indolininium methine dye having the formula

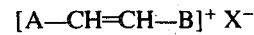

which comprises the steps of:

1. adding a preformed solution of a Vilsmeier adduct, formed by contacting an amine having the formula H—B with $POCl_3$ or phosgene and a di-lower alkylformamide, to a solution of a 2-methylindolininium salt the cation of which has the formula $A—CH_3^+$ in a water-miscible solvent to form an intermediate indolininium methine compound; and
2. converting the intermediate indolininium methine compound to its $X^-$ salt; wherein
   A is the residue of a 2-indolininium component of a cationic methine dye compound;
   B is the residue of an aniline, 1,2,3,4-tetrahydroquinoline or indole component of a cationic or disperse methine dye compound; and X is a $ZnCl_4$, iodide, tetrafluoroborate or perchlorate anion.

6. Process according to claim 5 for the preparation of a cationic indolininium methine dye having the formula

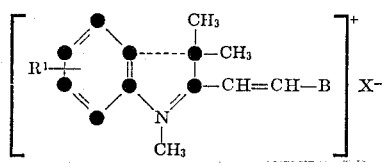

which comprises the steps of:
1. adding a preformed solution of a Vilsmeier adduct, formed by contacting an amine having the formula H—B with $POCl_3$ or phosgene and a di-lower alkylformamide, to a solution of a 2-methylindolininium salt the cation of which has the formula

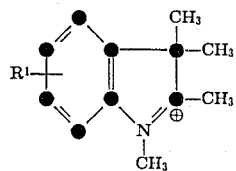

in a water-miscible solvent and heating the resulting mixture at about 20° to about 80° C. to form an intermediate indolininium methine compound; and
2. converting the intermediate indolininium methine compound to its $X^-$ salt; wherein
   $R^1$ is hydrogen, lower alkyl, lower alkoxy, halogen or lower alkoxycarbonyl; and
   B is a group having the formula

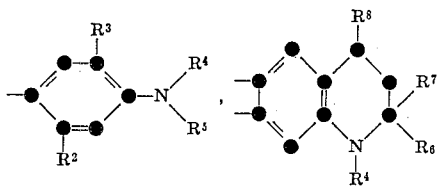

or

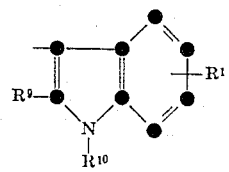

wherein
$R^1$ is defined above;
$R^2$ and $R^3$ each is hydrogen, lower alkyl, lower alkoxy or halogen;
$R^4$ and $R^5$ individually are unsubstituted or substituted alkyl containing up to 12 carbon atoms or cyclohexyl;
$R^4$ and $R^5$ collectively are $—(CH_2)_5—$, $—CH_2CH_2OCH_2CH_2—$ or $—CH_2CH_2SO_2CH_2CH_2—$;
$R^6$, $R^7$ and $R^8$ each is hydrogen or lower alkyl;
$R^9$ is lower alkyl, phenyl or phenyl substituted with lower alkyl, lower alkoxy or halogen; and
$R^{10}$ is hydrogen or lower alkyl.

7. Process according to claim 5 for the preparation of a cationic indolininium methine dye having the formula

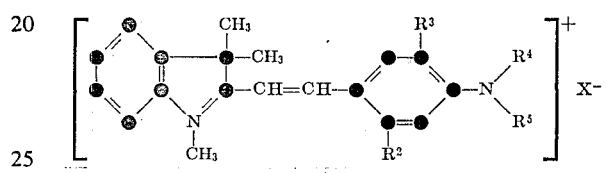

which comprises the steps of:
1. adding a preformed solution of a Vilsmeier adduct, formed by contacting an amine having the formula

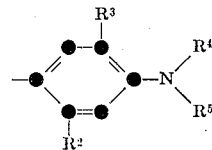

with $POCl_3$ and dimethylformamide, to a solution of a 1,2,3,3-tetramethylindolininium salt in a water-miscible solvent and heating the resulting mixture at about 20° to 80° C. to form an intermediate indolininium methine compound;
2. converting the intermediate indolininium methine compound to its X salt; and
3. isolating the cationic indolininium methine dye by filtration; wherein
   $R^2$ is hydrogen, methyl, methoxy, ethoxy or chlorine;
   $R^3$ is hydrogen, methyl, methoxy or ethoxy;
   $R^4$ is lower alkyl; cyclohexylmethyl; benzyl; benzyl substituted with lower alkyl, lower alkoxy, chlorine, bromine or lower alkoxycarbonyl; aryl; or a group having the formula $—R^{11}—R^{12}$ in which $R^{11}$ is ethylene, propylene, trimethylene or tetramethylene and $R^{12}$ is chlorine, bromine, lower alkanoxyloxy, cyano, lower alkoxycarbonyloxy, arylcarbamoyloxy, lower alkylcarbamoyloxy, aroyloxy, lower alkoxycarbonylbenzoyloxy, lower alkoxy, aryloxy, 2-benzothiazolythio, or a group having the formula

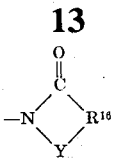

in which Y is —CO—, —SO$_2$—, or —CH$_2$— and R$^{16}$ is ethylene, propylene, trimethylene or o-arylene; and R$^5$ is lower alkyl; cyclohexyl, lower alkylcyclohexyl; benzyl; benzyl substituted with lower alkyl, lower alkoxy, chlorine or bromine; aryl; or a group having the formula —R$^{11}$—R$^{13}$ in which R$^{11}$ is ethylene, propylene, trimethylene or tetramethylene and R$^{13}$ is lower alkanoyloxy, lower alkoxycarbonyloxy, aroyloxy or lower alkoxy;

in which each aryl moiety is phenyl, tolyl, lower alkoxyphenyl or chlorophenyl and about one mole of indolininium salt per mole of amine is used.

8. Process according to claim 5 for the preparation of a cationic indolininium methine dye having the formula

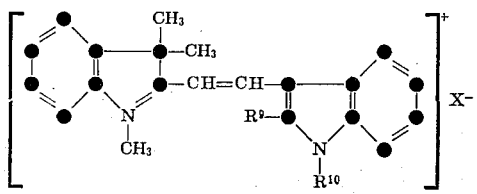

which comprises the steps of:

1. adding a preformed solution of a Vilsmeier adduct, formed by contacting an amine having the formula

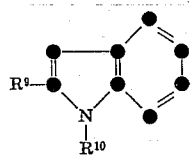

with POCl$_3$ and dimethylformamide, to a solution of a 1,2,3,3-tetramethylindolininium salt in a water-miscible solvent and heating the resulting mixture at about 20° to 80° C. to form an intermediate indolininium methine compound;

2. converting the intermediate indolininium methine compound to its X salt; and 3. isolating the cationic indolininium methine dye by filtration; wherein R$^9$ is phenyl, tolyl, lower alkoxyphenyl or chlorophenyl; and R$^{10}$ is hydrogen or lower alkyl;

in which about one mole of indolininium salt per mole of amine is used.

9. Process for the preparation of a cationic indolininium methine dye having the formula $$[A—CH=CH—B]^+ \ X^-$$

which comprises:

1. adding a solution of a 2-methylindolininium salt having the formula A—CH$_3$$^+$ X in a water-miscible solvent to a preformed solution of a Vilsmeier adduct, formed by contacting an amine having the formula H—B with POCl$_3$ or phosgene and a di-lower alkylformamide, and heating the resulting mixture at about 20° to 80° C. to form an intermediate compound; and 2. converting the intermediate indolininium methine compound to its X salt;

in which an acid acceptor is present prior to the conversion of the intermediate indolininium compound to its X salt; wherein A is the residue of a 2-indolininium component of a cationic methine dye compound;

B is the residue of an aniline, 1,2,3,4-tetrahydroquinoline or indole component of a cationic or disperse methine dye compound; and X is a ZnCl$_4$/2, iodide, tetrafluoroborate or perchlorate anion.

10. Process according to claim 9 wherein at least 2 mole equivalents of acid acceptor per mole of POCl$_3$ used in the synthesis of the Vilsmeier adduct are used.

* * * * *

PO-1050
(5/69)

UNITED STATES PATENT OFFICE
CERTIFICATE OF CORRECTION

Patent No. __3,855,209__  Dated __December 17, 1974__

Inventor(s) __Vinton A. Hoyle, Jr.__

It is certified that error appears in the above-identified patent and that said Letters Patent are hereby corrected as shown below:

Column 10, line 11, after "hydrogen," delete "1".

Column 11, line 16, delete "$ZnCl_4$" and insert -- $\dfrac{ZnCl_4}{2}$ --.

Column 12, line 6, delete "upt" and insert ---up---.

Column 12, lines 35-40, delete

"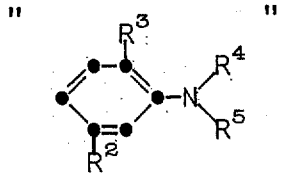"

and insert

--- 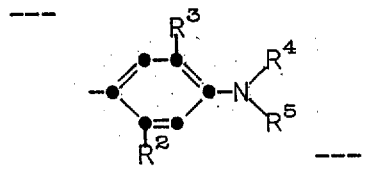 ---

Signed and sealed this 13th day of May 1975.

(SEAL)
Attest:

RUTH C. MASON
Attesting Officer

C. MARSHALL DANN
Commissioner of Patents
and Trademarks

Disclaimer 3,855,209.—*Vinton A. Hoyle, Jr.*, Kingsport, Tenn. SYNTHESIS OF INDO-LININIUM METHINE DYES. Patent dated Dec. 17, 1974. Disclaimer filed Nov. 7, 1975, by the assignee, *Eastman Kodak Company*.
Hereby enters this disclaimer to all claims of said patent.
[*Official Gazette February 10, 1976.*]